(12) United States Patent
Hashizume (10) Patent No.: US 8,279,504 B2
(45) Date of Patent: Oct. 2, 2012

(54) IMAGE READING APPARATUS CAPABLE OF READING BOTH SIDES OF A DOCUMENT

(75) Inventor: Asako Hashizume, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 788 days.

(21) Appl. No.: 12/407,236

(22) Filed: Mar. 19, 2009

(65) Prior Publication Data

US 2009/0244661 A1 Oct. 1, 2009

(30) Foreign Application Priority Data

Mar. 25, 2008 (JP) ................... 2008-079216

(51) Int. Cl.
*H04N 1/46* (2006.01)
(52) U.S. Cl. ............ 358/505; 358/1.9; 358/1.6; 358/2.1; 358/1.13; 358/1.14; 358/1.15; 358/518; 358/521; 358/538; 358/400; 358/408; 358/438; 358/439; 358/444; 358/447; 358/450; 358/452; 358/474; 358/497; 358/498; 358/396; 382/234; 382/284; 382/305; 382/306
(58) Field of Classification Search ................ None
See application file for complete search history.

(56) References Cited

U.S. PATENT DOCUMENTS

| 5,003,627 | A | * | 3/1991 | Wataya et al. | ............... | 382/305 |
| 5,586,228 | A | * | 12/1996 | Tokishige et al. | ............ | 358/1.16 |
| 6,961,142 | B2 | * | 11/2005 | Miyajima | .................... | 358/1.15 |
| 7,573,597 | B2 | * | 8/2009 | Futami | ........................ | 358/1.16 |
| 7,619,785 | B2 | * | 11/2009 | Sodeura et al. | ............... | 358/474 |
| 2007/0070388 | A1 | * | 3/2007 | Yamada | ....................... | 358/1.14 |

FOREIGN PATENT DOCUMENTS

| JP | 2005-304092 A | 10/2005 |
| JP | 2007-082033 A | 3/2007 |

* cited by examiner

*Primary Examiner* — Steven Kau
(74) *Attorney, Agent, or Firm* — Carter, DeLuca, Farrell & Schmidt LLP (57) ABSTRACT

Pieces of reading frequency information representing the use frequencies of first and second reading units are acquired. Read color information of a color on a document that is read by the first or second reading unit is acquired. Based on the acquired pieces of reading frequency information and the acquired read color information, one of the first and second reading units is decided as a reference reading unit serving as a reference when performing correction to make the reading characteristics of the first and second reading units relatively coincide with each other.

6 Claims, 9 Drawing Sheets

FREQUENCY — R READING FREQUENCY 0　　　　　　　255　R

FREQUENCY — G READING FREQUENCY 0　　　　　　　255　G

FREQUENCY — B READING FREQUENCY 0　　　　　　　255　B

IMAGE READING APPARATUS CAPABLE OF READING BOTH SIDES OF A DOCUMENT

BACKGROUND OF THE INVENTION

1. Field of the Invention

The present invention relates to an image reading apparatus capable of simultaneously reading both sides of a double-sided document using a first reading unit and a second reading unit different from the first reading unit.

2. Description of the Related Art

As a conventional reading function of electronically reading image information of a document, a copying machine, a facsimile apparatus, a multi-functional peripheral having a facsimile function, and a scanner serving as an image reading apparatus for computer input are popular. These image reading apparatuses are classified into two types: an image reading apparatus of one type reads a document while the document while it remains in one position, and an image reading apparatus of the other type reads a document while moving it. Examples of the latter type are a reading apparatus which automatically conveys a plurality of document sheets to continuously read them, and a reading apparatus which automatically reverses a double-sided document within the apparatus to read both sides of the double-sided document without a user's manipulation.

The double-sided document means a document bearing image information such as text and/or image data on both sides of the document, i.e., the front-side and back-side of the double-sided document.

In addition, as devices achieve more compact sizes and higher performance, reading apparatuses which simultaneously read the both sides of a double-sided document without reversing have recently become available. Such a reading apparatus is a simultaneous double-sided image reading apparatus having two reading devices; one for the front-side and one for the back-side.

When simultaneously reading pieces of image information on both sides of a double-sided document, the simultaneous double-sided image reading apparatus has the following advantages: it does not require efforts of the user, it can shorten the reading time in comparison with a reading apparatus which reverses a document, and it can reduce the occurrence rate of a jam because it uses only one document conveyance path.

At the same time, however, the simultaneous double-sided image reading apparatus has the following disadvantages. Since the front-side and back-side are read by different reading devices, the simultaneous double-sided image reading apparatus suffers the individual differences of the reading devices, a difference in the degree of deterioration of durability upon use for a predetermined period, and the like. The MTF (Modulation Transfer Function) also changes due to the difference in the degree of float of a document from the conveyance path at the reading position. As a result, characteristics such as the tints and geometrical characteristics of the read images of two sides may differ from each other. These characteristic differences become more serious in a simultaneous double-sided image reading apparatus using devices of different systems, e.g., the reduction optical system (CCD system) and equal-magnification optical system (CIS system) for the front-side and back-side.

If the reading characteristic of one image reading apparatus differs between the front-side and the back-side, the user will hesitate to use the apparatus. To prevent this, an image reading apparatus capable of double-sided reading needs to make at least front-side and back-side reading characteristics coincide with each other.

For example, Japanese Patent Laid-Open No. 2007-082033 proposes an arrangement which solves the above-described characteristic difference as follows. A CIS reading device for reading a front-side is added in a double-sided reading device including a CCD reading device for reading the front-side of a document, and a CIS reading device for reading the back-side. At the same time, a back-side path mechanism is arranged. The CCD reading devices read both the front-side and back-side, eliminating the difference between front-side and back-side reading characteristics.

However, the arrangement described in Japanese Patent Laid-Open No. 2007-082033 for solving the problem cannot completely prevent the difference between front-side and back-side reading characteristics that is generated due to the individual differences of the reading devices, a difference in the degree of deterioration of durability, and the like. Further, the arrangement described in Japanese Patent Laid-Open No. 2007-082033 goes against the current trend toward more compact, lighter-weight devices. The solutions of adding a reading device and arranging a back-side path are not optimum in the current development situation requiring cost reduction and space saving.

One method for solving the above-described problem is calibration. Calibration makes a plurality of device characteristics coincide with each other, and various charts and correction methods have been devised for calibration. Japanese Patent Laid-Open No. 2005-304092 proposes calibration which makes the reading characteristics of the front-side and back-side coincide with each other by reading a double-sided linear-density chart document and correcting at least the reading characteristic of one surface. However, according to the method in Japanese Patent Laid-Open No. 2005-304092, one surface is used as a reference to correct the reading characteristic of the other surface. For the corrected surface, the tint of an image obtained as a reading result greatly changes before and after calibration.

This problem will be explained in more detail with reference to FIGS. 2A and 2B.

Figure 2A:
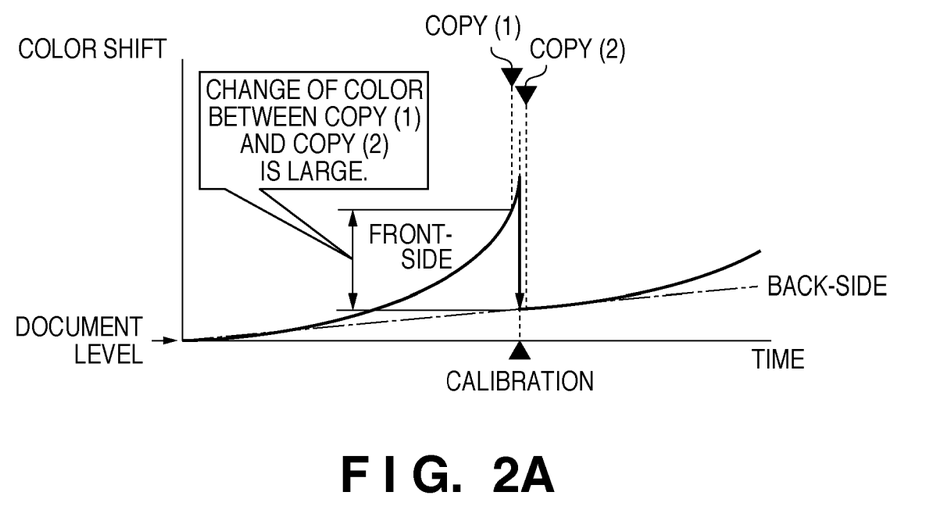
FIGS. 2A and 2B are graphs illustrating the concept of front-side/back-side calibration.
Figure 2B:
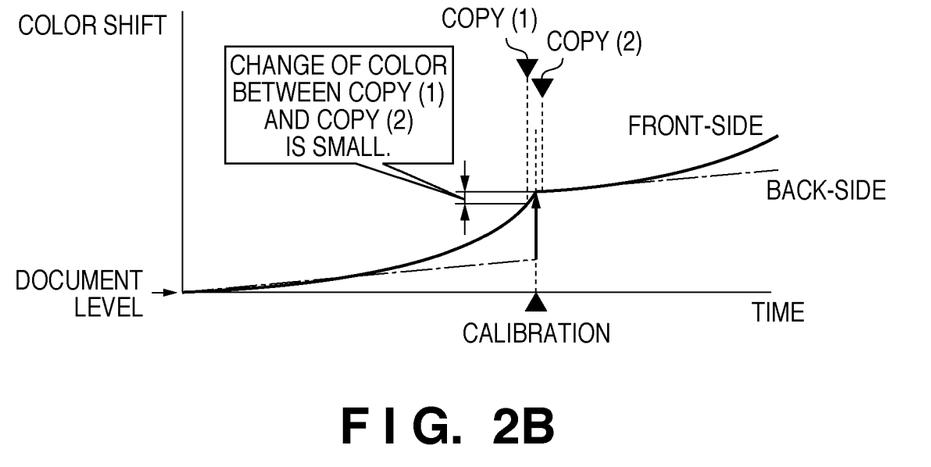

In FIGS. 2A and 2B, the abscissa axis represents the time, and the ordinate axis represents the degree of color shift from a document. A solid line represents a change of the reading characteristic of the first reading device 110 (referred to hereinafter as a "front-side reading device"), and a broken line represents that of the reading characteristic of the second reading device 111 (referred to hereinafter as a "back-side reading device"). The front-side reading device is used in both single-sided reading and double-sided reading, and considered to deteriorate more than the back-side reading device.

FIG. 2A shows a case where correction is done using the back-side reading device as a reference in calibration. The reading characteristic of the front-side reading device is greatly improved, and the reading characteristics of the front-side and back-side reading devices can be made to coincide with each other. However, the tint becomes greatly different between single-sided copy (1) immediately before calibration and single-sided copy (2) immediately after calibration.

FIG. 2B shows a case where calibration is done using the front-side reading device as a reference. The reading characteristics of the front-side and back-side reading devices coincide with each other, and the difference in tint between single-sided copy (1) and single-sided copy (2) is also suppressed. However, as described above, the front-side reading device is used in both single-sided reading and double-sided reading, and is used more frequently than the back-side reading device. The durability is considered to deteriorate more. When correction is done using the front-side reading device as a reference, the precision of color processing is adjusted to a lower one. That is, the color differs more from a document.

In FIG. 2A, even when the same document as that before several hours or several days is single-sided-copied again, an output result different in tint is obtained. A user who usually uses single-sided copying will find the output results to be unnatural. In FIG. 2B, color matching between the front-side and back-side reading devices is implemented. However, the reading characteristics of the front-side and back-side reading devices are uniformly impaired, failing to achieve the purpose of calibration.

SUMMARY OF THE INVENTION

The present invention has been made to overcome the conventional drawbacks. The present invention causes the reading characteristics of front-side and back-side reading devices to coincide with each other in calibration. The present invention implements calibration that does not give a user a sense of unnaturalness before and after calibration even in single-sided reading. As a purpose of calibration, it is more important to make the quality of a read image coincide with the original image quality of a document, than to make the reading characteristics of front-side and back-side reading devices coincide with each other.

According to one aspect of the present invention, there is provided an image reading apparatus capable of reading both sides of a double-sided document (i.e., a front-side and a back-side) using a first reading unit and a second reading unit different from the first reading unit. The image reading apparatus includes: a first acquisition unit adapted to acquire pieces of reading frequency information representing use frequencies of the first reading unit and the second reading unit; a second acquisition unit adapted to acquire read color information of a color on a document that is read by one of the first reading unit and the second reading unit; and a decision unit adapted to decide, based on the pieces of reading frequency information acquired by the first acquisition unit and the read color information acquired by the second acquisition unit, one of the first reading unit and the second reading unit as a reference reading unit serving as a reference when performing correction to make reading characteristics of the first reading unit and the second reading unit relatively coincide with each other.

Further features of the present invention will be apparent from the following description of exemplary embodiments with reference to the attached drawings.

DESCRIPTION OF THE EMBODIMENTS

Exemplary embodiments of the present invention are described in detail below with reference to the drawings. It should be noted that the relative arrangement of the components, the numerical expressions and numerical values set forth in these embodiments do not limit the scope of the present invention unless it is specifically stated otherwise.

The present invention is directed to a simultaneous double-sided image reading apparatus (FIGS. 1A and 1B) having two reading devices: a front-side reading device 110 (first reading unit) and a back-side reading device 111 (second reading unit) which simultaneously or practically simultaneously read both sides of a double-sided document by one conveyance without reversing the document.

In particular, the present invention has a feature of deciding a surface serving as a reference for each color in calibration (correction) for making the reading characteristics of the front-side and back-side reading devices 110 and 111 of the simultaneous double-sided image reading apparatus (simply referred to hereinafter as a "reading apparatus") relatively coincide with each other. In double-sided reading, the present invention makes the reading characteristics of the front-side and back-side reading devices 110 and 111 coincide with each other. In single-sided reading, the present invention prevents the user from perceiving an abrupt change in reading characteristic before and after calibration (correction).

Note that the term "reading" in the present invention includes a concept of acquiring image information by scanning an image on a document.

For convenience, embodiments according to the present invention will describe a reading apparatus mounted in a copying machine. However, the above-described problem occurs even in reading apparatuses mounted in other apparatuses such as a facsimile apparatus. Hence, the present invention provides an effective solution even for reading apparatuses mounted in other apparatuses.

Figure 1A:
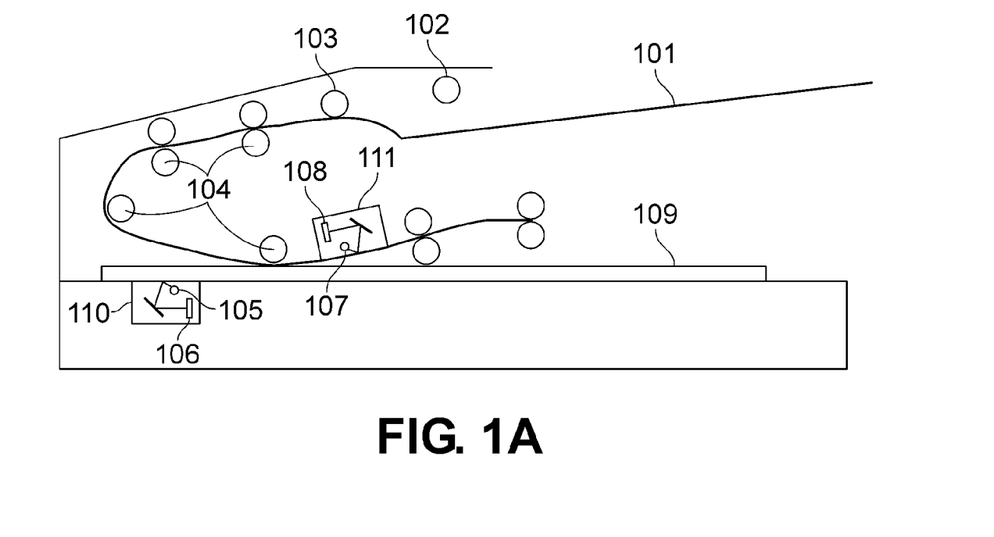
FIG. 1A is a sectional view showing an example of the mechanical structure of a reading apparatus and FIG. 1B is a block diagram showing an example of a controller and storage unit of the reading apparatus of FIG. 1A.

FIG. 1A is a sectional view showing an example of the mechanical structure of a reading apparatus according to the first embodiment of the present invention.

A document is set on a document feeder 101 with its front-side facing up. Then, a reading device 110 reads the front-side of the document, and a reading device 111 reads its back-side. In the following description, a surface read by the same reading device 110 as that in single-sided reading will be defined as a front-side, and a surface read by the reading device 111 will be defined as a back-side. However, the reading apparatus does not always have this arrangement. For example, the reading device 110 may be an equal-magnification optical system (CIS system), and the reading device 111 may be a reduction optical system (CCD system). The number of document conveyance paths and the number of rollers 104 are not limited to those illustrated in FIG. 1A.

In FIG. 1A, the image reading apparatus includes a document feeder 101, a pickup roller 102, a conveyance roller 103, rollers 104, light sources 105 and 107, reading units 106 and 108, and a document glass 109. A first reading device 110 is formed from the light source 105 and reading unit 106. A second reading device 111 is formed from the light source 107 and reading unit 108.

Double-sided documents set on the document feeder 101 with their front-side facing up are conveyed one by one by the pickup roller 102 to the reading path. The picked-up document is conveyed by the rollers 104 into the apparatus via the conveyance roller 103. The reading unit 106 is arranged together with the light source 105. The light source 105 has a spectral intensity in almost the wavelength region of visible light.

The light source 105 irradiates one document surface (front-side) of the document which has reached the reading position of the first reading device 110. Light reflected by the document upon irradiation enters the reading unit 106. Similarly, the light source 107 irradiates the opposite (other) document surface (back-side) which has reached the reading position of the second reading device 111. Light reflected by the document upon irradiation enters the reading unit 108.

The reading units 106 and 108 include at least photoelectric conversion elements. Each photoelectric conversion element stores the amount of charges corresponding to the intensity of incident light. The charges are converted from an analog signal into a digital signal by an A/D converter (not shown), thus converting image information on a document into digital image data. The intensities of light entering the reading units 106 and 108 depend on the distribution of spectral reflectances included in information on a document.

In this manner, the front-side of a double-sided document which has been conveyed and has reached the reading position is read by the light source 105 and reading unit 106, and its back-side is read by the light source 107 and reading unit 108. The "front-side" means the same surface as a document surface in single-sided reading, and the "back-side" means a surface opposite to that in single-sided reading.

Figure 1B:
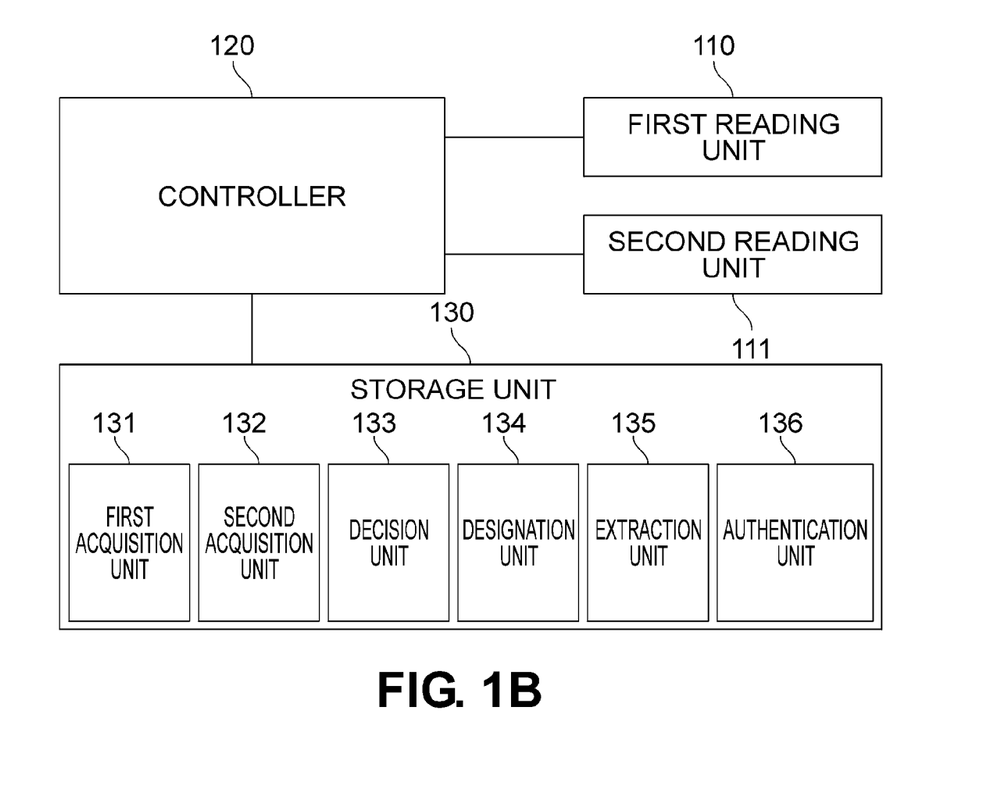

As shown in FIG. 1B, the reading apparatus or the copying machine which incorporates the reading apparatus includes a controller (CPU) 120 for controlling the reading apparatus including the first reading unit 110 and the second reading unit 111, and a storage unit 130 (e.g., a RAM and ROM) for storing data such as control programs and parameters. The control programs also include programs for executing processing such as that illustrated in flowcharts to be described later.

The controller 120 reads out and executes a control program stored in the storage unit 130 to control the operation of the reading apparatus. As shown in FIG. 1B, the control program may include program code that implements a first acquisition unit 131, a second acquisition unit 132, a decision unit 133, a designation unit 134, and an extraction unit 135. The first acquisition unit 131 acquires reading frequency information representing use frequencies of the first reading unit 110 and the second reading unit 111. The second acquisition unit 132 acquires read color information of a color on a document that is read by one of the first reading unit 110 and the second reading unit 111. The decision unit 133 decides, based on the reading frequency information acquired by the first acquisition unit 131 and the read color information acquired by the second acquisition unit 132, one of the first reading unit 110 and the second reading unit 111 as a reference reading unit serving as a reference when performing correction to make reading characteristics of the first reading unit and the second reading unit relatively coincide with each other. The designation unit 134 designates a reference reading unit for a designated color. The extraction unit 135 extracts color difference data between first read data obtained by reading, by the first reading unit 110, a chart document, on one surface of which patch images of a plurality of density patterns are printed, and second read data obtained by reading the chart document by the second reading unit 111. The authentication unit 136 authenticates a user. An operation unit for operating the reading apparatus is also attached to the reading apparatus main body or copying machine. These building components are generally mounted in a reading apparatus or a copying machine which incorporates the reading apparatus.

Calibration according to an exemplary embodiment of the present invention is described below with reference to FIG. 3.

Figure 3:
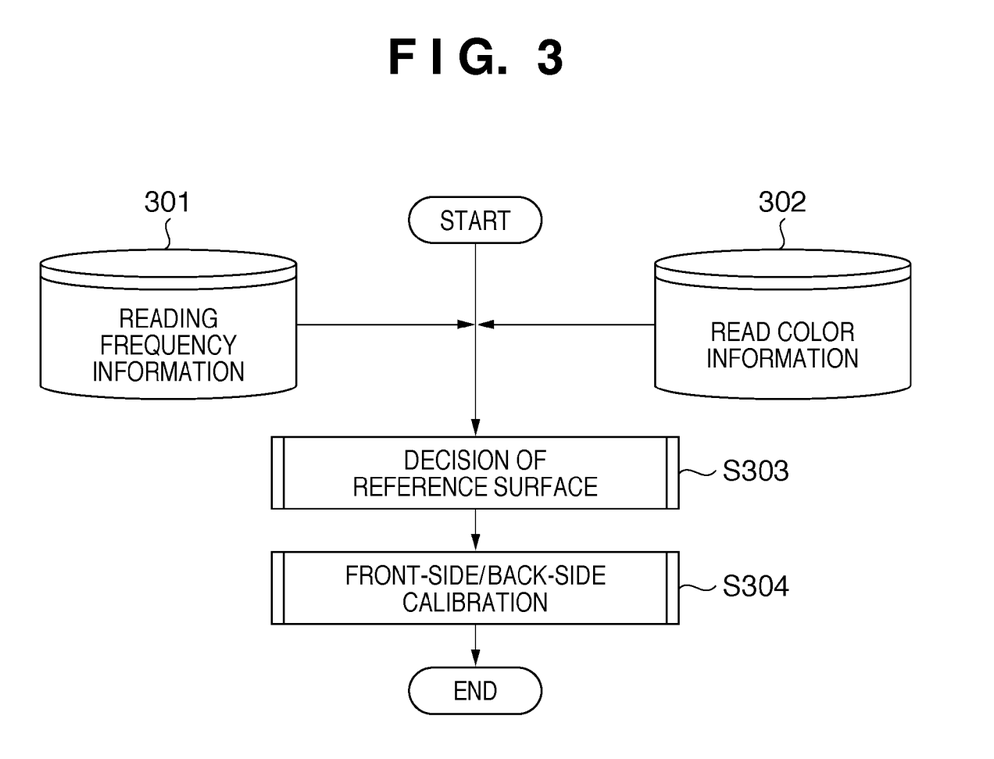
FIG. 3 is a flowchart showing calibration according to an embodiment of the present invention.

FIG. 3 is a flowchart showing calibration according to the first embodiment of the present invention.

In the first embodiment, when performing calibration, the controller 120 decides, for each color, a reference surface (front-side or back-side) used to make the reading characteristics of the front-side and back-side reading devices 110 and 111 relatively coincide with each other (step S303). A reference surface (reference reading unit) is decided for each color using reading frequency information 301 representing the frequencies of use of the front-side and back-side reading devices 110 and 111, and read color information 302 representing statistical data of colors on a document read by the front-side reading device 110 or back-side reading device 111.

The reading frequency information 301 and read color information 302 implement selection of a reference surface which does not give the user a sense of unnaturalness. The reading frequency information 301 and read color information 302 are totaled in normal use in order to obtain the frequency of use by the user.

In step S304, the controller 120 executes front-side/back-side calibration (described below) based on the decided reference surface.

The reading frequency information 301 and read color information 302 are described below.

A method of totaling the reading frequency information 301 is described below. The reading frequency information 301 is an index for determining the frequency at which the reading apparatus is used.

According to the simplest method, when initially setting the reading apparatus, a counter for counting reading operations is initialized to 0, and subsequent reading operations are counted regardless of whether the reading is single-sided reading or double-sided reading. By separately counting single-sided and double-sided reading operations, the frequency of use by the user can be determined in more detail.

As an alternative, reading operations in a predetermined period can be counted. As yet another alternative, reading operations of a predetermined number or more of copies can be counted. As yet another alternative, reading operations of a predetermined number or more of pages can be counted. Furthermore, a combination of the above-mentioned counting conditions can be used. Since obtained information changes depending on the count setting, the counting method is not limited to the above-mentioned ones. A counting method suitable for the use of the device suffices to be adopted in accordance with the time when the situation in which the above-described problem is avoided occurs.

A method of totaling the read color information 302 is described below. The read color information 302 is important for determining the situation of use of the reading apparatus by mainly a user of single-sided reading. It is not practical to save all color data obtained from a read document image, so the trend of a color frequently read by the user is determined. Further, the situation of use by a user of single-sided reading is determined for calibration which prevents the user from perceiving an abrupt change in color.

The read color information 302 is spooled using a histogram based on, e.g., gamut information of an image.

Figure 4:
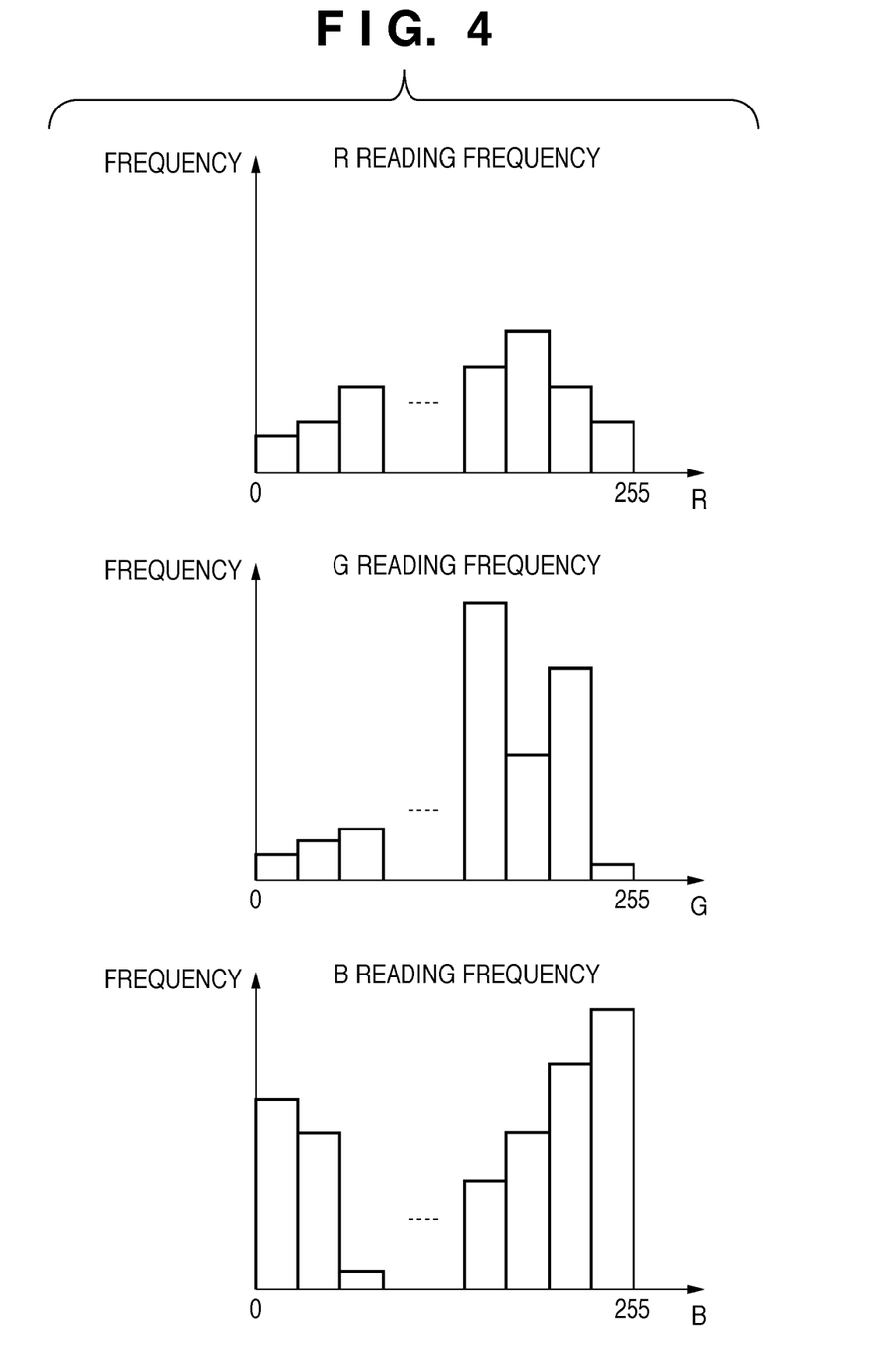
FIG. 4 is a graph showing examples of histograms obtained by a color information setting method.

As the first gamut information setting method, R, G, and B are divided every N tones in a device-independent RGB space, and separately totaled. The first method uses a onedimensional histogram, and three, R, G, and B histograms are obtained as shown in example illustrated in FIG. 4.

Figure 5A:
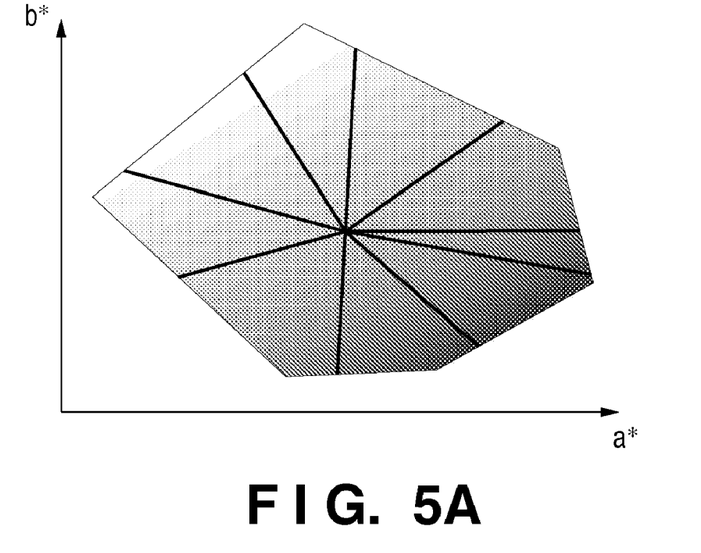
FIGS. 5A and 5B are graphs showing examples of a histogram and pie chart obtained by another information setting method.

As the second gamut information setting method, gamuts readable by the reading apparatus are classified in advance into several regions of different color systems. For example, as shown in FIG. 5A, the hue is divided radially from the origin on the a* and b* axes in the L*a*b* space. This also applies to another color space such as the L*u*v* space as long as color systems can be classified by two parameters. As a classification, a gamut of low color saturation may also be added. In any case, the second method uses a two-dimensional histogram.

Figure 5B:
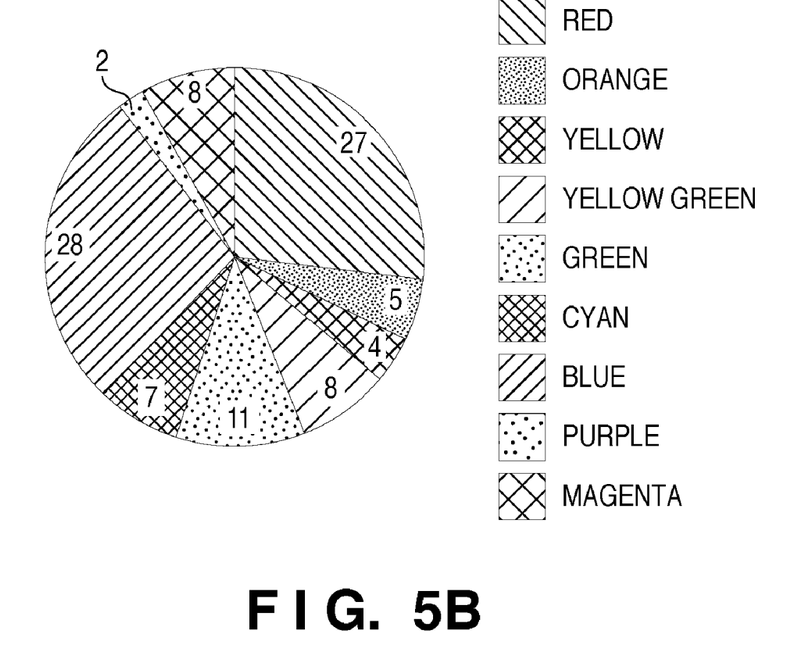

FIG. 5B shows a pie chart of the voting results of virtual gamuts. Numerical values in the chart represent the ratios of the reading frequencies of classified gamuts, but in practice, may also represent voting results.

As the third gamut information setting method, the gamut is divided in consideration of three parameters in the L*a*b* space, L*u*v* space, device-independent RGB space, or the like. The third method uses a three-dimensional histogram.

The necessary memory capacity tends to increase in the order of the first to third gamut information setting methods. As the tone step in setting each gamut becomes smaller, the necessary memory capacity becomes larger. In practice, the second gamut information setting method is used to radially divide the a*b* space into about nine gamuts, thus obtaining a rough color trend of a read document. The data collection method suffices to be decided in consideration of the user need and device specifications. Hence, not gamuts but all read colors may also be processed.

A concrete method of spooling color information of one document upon single-sided reading by the user is explained below with reference to FIG. 6.

Figure 6:
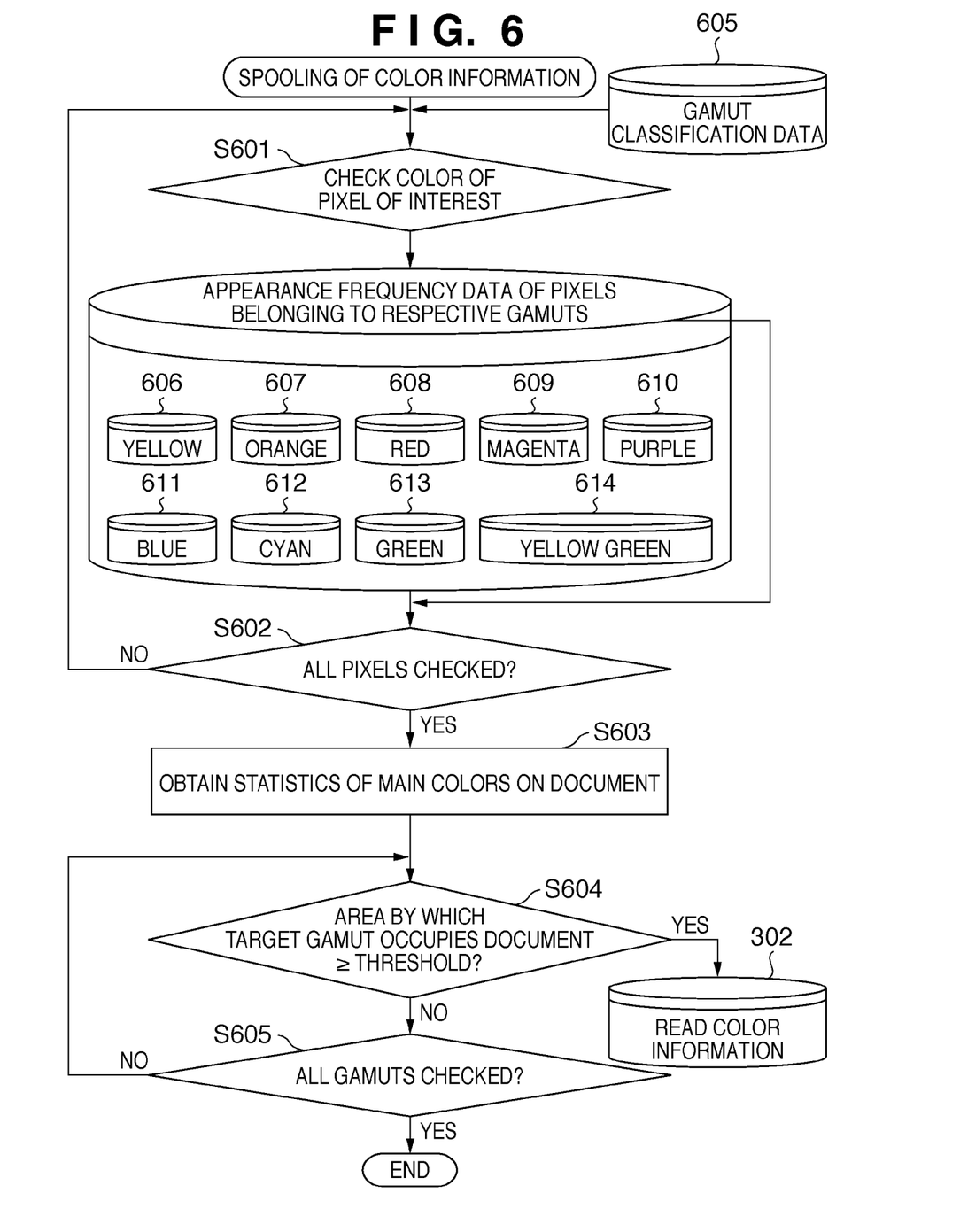
FIG. 6 is a flowchart showing processing of spooling color information of one document.

FIG. 6 is a flowchart showing processing of spooling color information of one document according to an embodiment of the present invention.

Note that the histogram is created based on the above-described second gamut information setting method.

In addition to a memory area for the histogram, memory areas corresponding to the number of histogram items are reserved in the storage unit 130 of the reading apparatus. The reserved memory areas are used to store appearance frequency data of respective gamuts. Since colors are classified into nine gamuts, nine memory areas 606 to 614 are reserved. When the user designates reading of a document, the document is scanned from the end to read the document image in this processing.

In step S601, the controller 120 determines, for each pixel, a gamut containing a pixel of target by referring to gamut classification data 605 of the reading apparatus of FIGS. 1A and 1B. The frequency of appearance is counted for each memory area in accordance with the determination result of step S601, generating appearance frequency data representing the frequency of appearance.

In step S602, the controller 120 determines whether all pixels on the document have been checked. If all the pixels have been checked (YES in step S602), the process advances to step S603. If all the pixels have not been checked (NO in step S602), the process returns to step S601.

In step S603, the controller 120 calculates the ratio at which pixels of each gamut occupy the document, in order to obtain only the statistics of main colors on the document. Then, in step S604, the controller 120 determines whether pixels of a target gamut have a color which appears at a predetermined ratio or more on the document (i.e., determines whether the ratio is equal to or higher than a threshold). If the ratio is lower than the threshold (NO in step S604), the process advances to step S605. If the ratio is equal to or higher than the threshold (YES in step S604), the controller 120 votes information representing the gamut to the histogram of the read color information 302. That is, the number of votes to the histogram in one reading operation is 1 or 0 in each gamut. Thus, the maximum number of votes is 9.

In step S605, the controller 120 determines whether all the gamuts have been checked. If not all the gamuts have been checked (NO in step S605), the process returns to step S604. If all the gamuts have been checked (YES in step S605), spooling of read color information is completed.

The present embodiment adopts the second gamut information setting method as the histogram creation method, but the histogram creation method is not limited to this. For example, even when the first or third gamut information setting method is used, the frequency of appearance of each gamut on a document can be similarly calculated. When the ratio at which the gamut occupies the image is equal to or higher than a predetermined value, the gamut can be voted as read color information to the histogram.

However, when the first gamut information setting method is used, R, G, and B are individually processed. In subsequent processing (step S303), not only actually frequently read colors, but also colors having almost the same R, G, or B tone level as them are determined to be frequently read colors. When spooling read color information, color space data dependent on a reading device is converted into a color space suited to an appropriately set color classification.

In the above-described way, the reading frequency information 301 and read color information 302 necessary to decide a reference surface in FIG. 3 can be acquired.

Referring back to FIG. 3, in step S303, the controller 120 decides a reference surface for each color. The condition to decide a reference surface is to prevent a user of single-sided reading from perceiving an abrupt change in tint before and after calibration. To achieve this, calibration may be done using the front-side of a document as a reference. However, the front-side of a document is used in both single-sided reading and double-sided reading. The reading device 110 (a front-side reading unit 106) is considered to deteriorate more in reading performance than the reading device 111 (a back-side reading unit 108).

For this reason, calibration is done using the back-side reading device 111 as a reference as much as possible to maintain the reading precisions of the front-side and back-side reading devices 110 and 111. For a color often read by the front-side reading device 110, the front-side reading device 110 is used as a reference.

Figure 7:
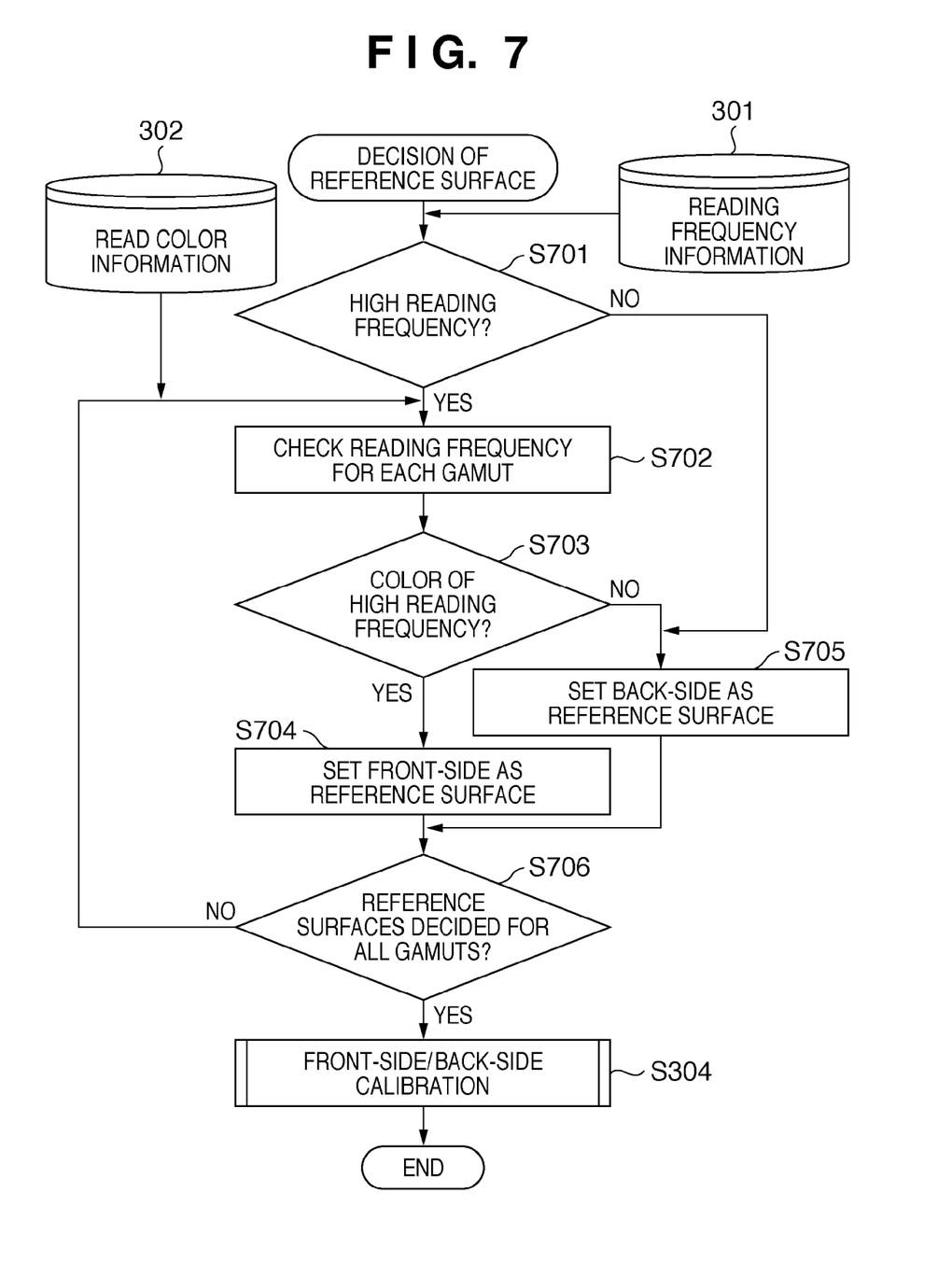
FIGS. 7-9 are flowcharts showing details of examples of processing for deciding a reference surface.

Details of the reference surface decision processing in step S303 will be explained with reference to FIG. 7. FIG. 7 is a flowchart showing details of the processing in step S303 according to the present embodiment of the present invention.

When calibration starts, the controller 120 refers to the reading frequency information 301 (first acquisition) to determine in step S701 whether a target reading frequency is high. More specifically, the controller 120 determines whether a reading frequency represented by reading frequency information is higher than a threshold. Note that the reading frequency information 301 provides both pieces of reading frequency information serving as pieces of use frequency information of single-sided reading and double-sided reading.

If the reading frequency information is equal to or lower than the threshold (NO in step S701), it can be determined that the above-described problem need not be considered. This is because when the reading frequency information 301 of single-sided reading to be determined is equal to or lower than the threshold, few users frequently use single-sided reading. In addition, this is because when the reading frequency information 301 of double-sided reading to be determined is equal to or lower than the threshold, the reading apparatus itself is hardly used. In this example, the reading frequency itself is determined, but it is also possible to calculate the ratio of the single-sided reading frequency to the double-sided reading frequency in accordance with the reading frequency information 301, and determine the ratio.

If the reading frequency information is equal to or lower than the threshold, the controller 120 sets the back-side as a reference surface for all gamuts in step S705.

If the reading frequency information is higher than the threshold (YES in step S701), the controller 120 refers to the read color information 302 (second acquisition) to check the reading frequency for each gamut in step S702. Then, in step S703, the controller 120 determines whether the reading frequency of a target gamut is high.

More specifically, the controller 120 calculates the relative reading frequency of each gamut to reading frequency information of single-sided reading. If the calculated relative reading frequency is higher than a predetermined threshold (YES in step S703), the controller 120 determines that the color has high reading frequency, and sets the front-side as a reference surface for the gamut in step S704. If the calculated relative reading frequency is equal to or lower than the predetermined threshold (NO in step S703), the controller 120 determines that the color has low reading frequency, and sets the back-side as a reference surface for the gamut in step S705.

The threshold is set to, e.g., 60%. The determination method in step S703 is not limited to the above-described one. For example, histogram data represented by reading frequency information may also undergo threshold processing without calculating a relative reading frequency.

In step S706, the controller 120 determines whether reference surfaces have been decided for all gamuts. If reference surfaces have not been decided for all gamuts (NO in step S706), the process returns to step S702 to execute processing for an unprocessed gamut. If reference surfaces have been decided for all gamuts (YES in step S706), in step S304, the controller 120 executes front-side/back-side calibration as calibration for the front-side reading device 110 or back-side reading device 111 based on the decided reference surface.

Although the front-side/back-side calibration in step S304 can be executed by a variety of methods, the calibration method is arbitrary as long as it performs relative color matching of the front-side and back-side. That is, any method is available as long as calibration is done by switching a reading device to be calibrated in accordance with a reference surface decided for each gamut.

As described above, according to the present embodiment, when calibrating the reading apparatus, the reading characteristics of the front-side and back-side reading devices 110 and 111 can be made to coincide with each other in double-sided reading. In single-sided reading, the reading apparatus can perform calibration which prevents the user from perceiving an abrupt change in reading characteristic before and after calibration. That is, an unnatural reading result due to an abrupt change in reading characteristic of single-sided reading before and after calibration can be prevented. As long as these effects can be obtained, reading can be done while maintaining the reading characteristic as close as possible to the original image quality of a document.

In the above-described embodiment, a reference surface corresponding to a reading device to be calibrated is automatically determined for all gamuts. However, it is necessary to determine a reference surface which always places importance on the precision for a color whose absolute tint is important, for example, a company logo. Another embodiment described next will explain an arrangement in which the user designates in advance a color which places importance on the precision (designates a reference surface).

Figure 8:
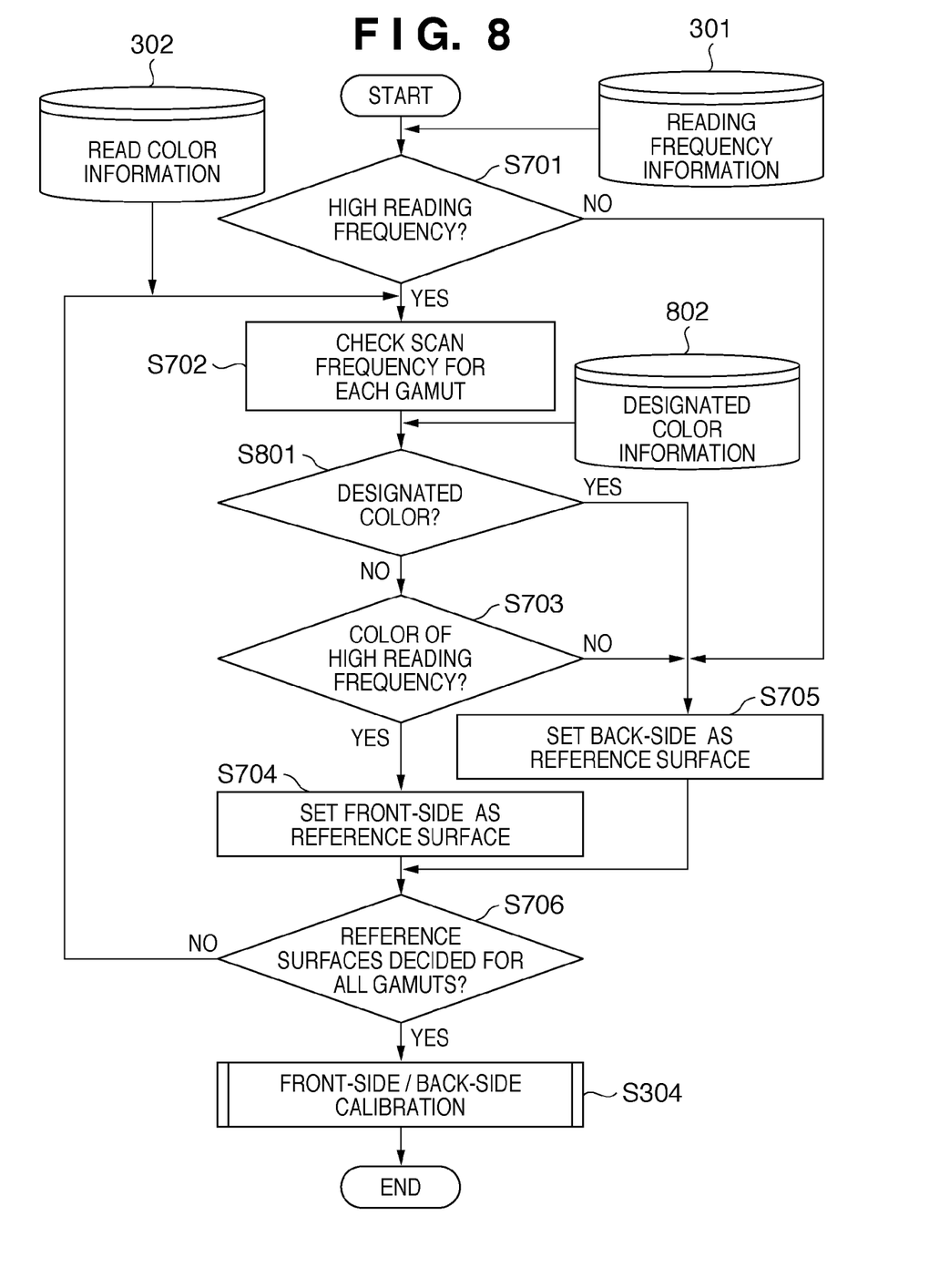

FIG. 8 is a flowchart showing details of processing in step S303 according to an embodiment of the present invention.

In FIG. 8, the same step numbers as those in FIG. 7, of the embodiment described above, denote the same steps, and a description thereof will not be repeated. The difference of FIG. 8 from FIG. 7 is that step S801 is added. In the present embodiment, a color designated in advance by the user to place importance on the precision is stored as designated color information 802 in the internal storage unit of the reading apparatus.

After processing in step S702, the controller 120 refers to the designated color information 802 to determine in step S801 whether the gamut to be processed includes a color designated by the user. If the gamut does not include the designated color (NO in step S801), the process advances to step S703. If the gamut includes the designated color (YES in step S801), the controller 120 sets the back-side as a reference surface for the gamut in step S705. As a result, the precision of the tint can be maintained as much as possible for a color whose absolute tint is important.

As described above, according to the present embodiment, in addition to the effects described in the previous embodiment, calibration capable of further maintaining the image quality of a document can be executed for a document including a color whose original quality is important (is to be maintained).

Another embodiment is described below which describes an arrangement in which the reference surface is determined based on the state of a device in calibration.

Figure 9:
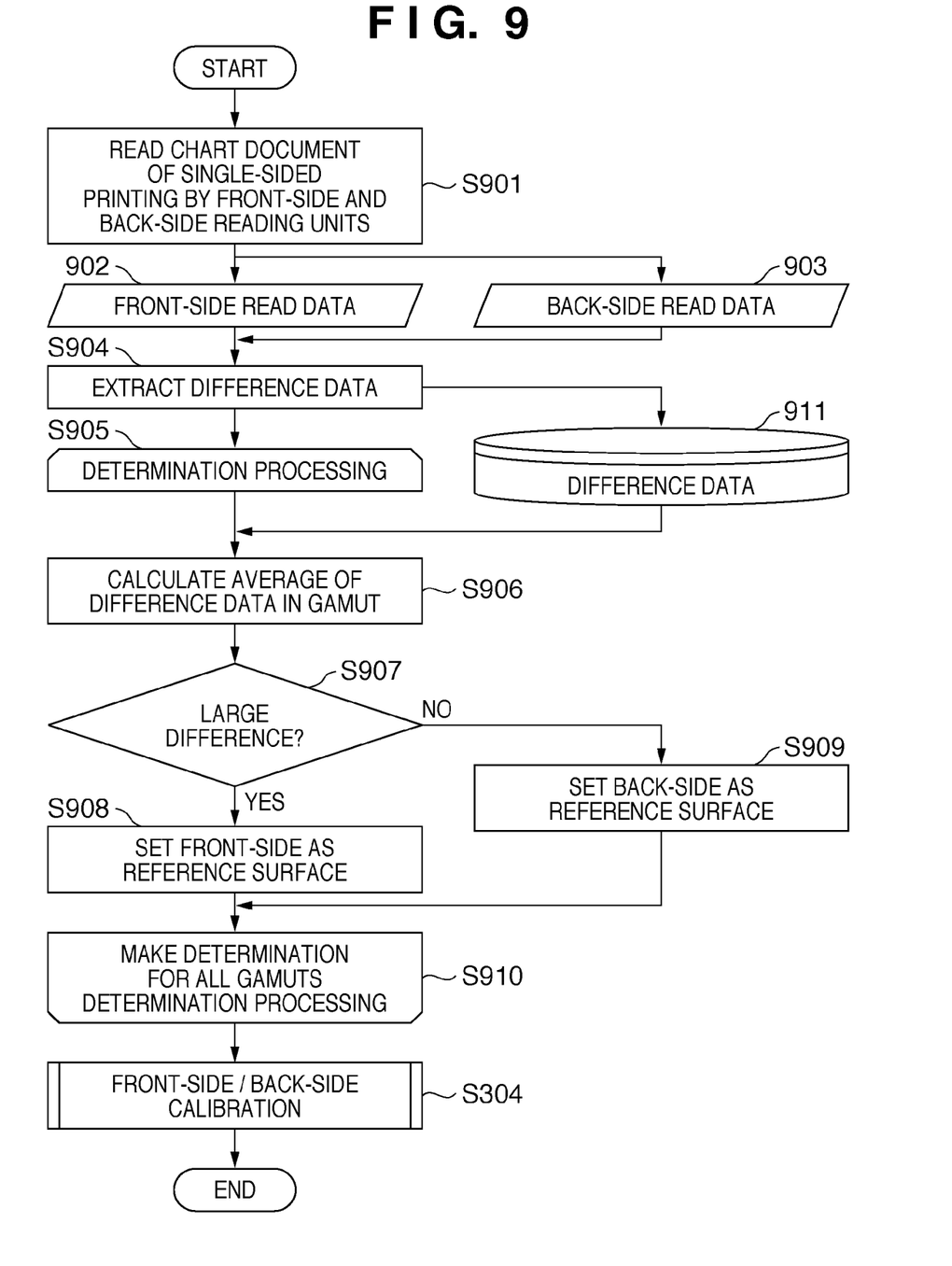

FIG. 9 is a flowchart showing details of processing in step S303 according to the present embodiment of the present invention.

First, a chart document, on one surface of which patch images of a plurality of density patterns are printed, is set on a document feeder 101. Then, in step S901, the controller 120 reads the document using front-side and back-side reading devices 110 and 111, acquiring front-side read data 902 and back-side read data 903. In other words, the controller 120 reads a single chart document by the front-side and back-side reading devices 110 and 111, acquiring the front-side read data 902 (first read data) and the back-side read data 903 (second read data).

In step S904, the controller 120 extracts, from the front-side read data 902 and back-side read data 903, color difference data between read data corresponding to a position where each patch image exists. The controller 120 saves the extracted data as difference data in a memory.

Thereafter, the controller 120 executes reference surface determination processing in step S905. The reference surface may also be determined for each color of a patch image, but is determined for each gamut, similar to the first embodiment described above.

In step S906, the controller 120 detects difference data 911 of patches in one gamut, and calculates the average of the difference data. In step S907, the controller 120 determines whether the calculated difference data is large. More specifically, if the difference data is larger than a threshold, the controller 120 determines that the difference data is large.

If the difference data is large (YES in step S907), i.e., the difference data is larger than the threshold, the controller 120 sets the front-side as a reference surface in step S908. If the difference is small (NO in step S907), i.e., the difference data is equal to or smaller than the threshold, the controller 120 sets the back-side as a reference surface in step S909.

If the color component difference (difference data) between the front-side and the back-side is large and the back-side is set as a reference surface, the above-described problem becomes serious. To prevent this, the front-side is set as a reference surface to execute calibration which does not give a user of single-sided reading a sense of unnaturalness. When the color component difference between the front-side and the back-side is small, the correction amount of the reading characteristic of the reading device by calibration is also small. Thus, the back-side which can undergo calibration that further maintains the precision is set as a reference surface.

In step S910, the controller 120 determines whether determination has been made for all gamuts, and repeats the determination processing until determination has been made for all gamuts. Finally in step S304, the controller 120 executes front-side/back-side calibration.

As described above, according to the present embodiment, neither the reading frequency information 301 nor read color information 302 need always be stored. Calibration which solves the above-described problem can be performed without arranging an additional memory or increasing the load on the device.

A method of performing the above-described calibration for each user is described below. The trend of use of a reading apparatus differs between users. By determining the situation of use by each user and applying calibration, the effects of calibration can be maximized. The present embodiment is premised on that the reading apparatus has a user authentication function of authenticating a user, e.g., implemented by the authentication unit 136 of FIG. 1B. Use frequency information and use color information are collected for each user by the same method as the one described above in a reading apparatus having an interface capable of identifying a user by the user authentication function such as fingerprint authentication, ID card-based authentication, or input authentication code-based authentication. After user authentication, calibration is executed. As a result, calibration which reflects the trend of a user can be implemented.

As described above, according to the present embodiment, calibration corresponding to the situation of use by a user can be executed. A reading environment suited to each user can be provided for each user.

Note that the present invention can be applied to an apparatus comprising a single device or to system constituted by a plurality of devices.

Furthermore, the invention can be implemented by supplying a program (software), which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information such that the program is installed in the user computer.

Besides the cases where the above-described functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium, it can be written to a function expansion board inserted into the computer or to a memory provided in a function expansion unit connected to the computer, a CPU or the like mounted on the function expansion board or function expansion unit that performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-079216 filed on Mar. 25, 2008, which is hereby incorporated by reference herein in its entirety.

What is claimed is:

1. An image reading apparatus capable of reading both sides of a double-sided document using a first reading unit and a second reading unit different from the first reading unit, the image reading apparatus comprising:
a first acquisition unit configured to acquire pieces of reading frequency information representing the number of reading counts of the first reading unit and the second reading unit, respectively;
a second acquisition unit configured to acquire read color information representing appearance frequency of each gamut of a color on a document that is read by one of the first reading unit and the second reading unit; and
a decision unit configured to decide, based on the pieces of reading frequency information and the read color information, one of the first reading unit and the second reading unit as a reference reading unit serving as a reference when performing correction to make reading characteristics of the first reading unit and the second reading unit relatively coincide with each other,
wherein the decision unit is configured to decide the reference reading unit for each color represented by the read color information.

2. The image reading apparatus according to claim 1,
wherein, for a color whose frequency of appearance is larger than a threshold, the decision unit is configured to decide, as the reference reading unit, a reading unit corresponding to a higher use frequency among use frequencies represented by the pieces of reading frequency information, and wherein, for a color whose frequency of appearance is not larger than the threshold, the decision unit is configured to decide, as the reference reading unit, a reading unit corresponding to a lower use frequency among use frequencies represented by the pieces of reading frequency information.

3. The image reading apparatus according to claim 1, further comprising a designation unit configured to designate a reference reading unit for a designated color.

4. The image reading apparatus according to claim 1,
wherein the decision unit comprises an extraction unit configured to extract color difference data between first read data obtained by reading, by the first reading unit, a chart document, on one surface of which patch images of a plurality of density patterns are printed, and second read data obtained by reading the chart document by the second reading unit, wherein, for a color whose color difference data represented by the read color information is larger than a threshold, the decision unit is configured to decide, as the reference reading unit, a reading unit corresponding to a higher use frequency among use frequencies represented by the pieces of reading frequency information, and wherein, for a color whose color difference data represented by the read color information is not larger than the threshold, the decision unit is configured to decide, as the reference reading unit, a reading unit corresponding to a lower use frequency among use frequencies represented by the pieces of reading frequency information.

5. A method of controlling an image reading apparatus capable of reading both sides of a double-sided document using a first reading unit and a second reading unit different from the first reading unit, the method comprising:

acquiring pieces of reading frequency information representing the number of reading counts of the first reading unit and the second reading unit, respectively;

acquiring read color information representing appearance frequency of each gamut of a color on a document that is read by one of the first reading unit and the second reading unit; and deciding, based on the pieces of reading frequency information and the read color information, one of the first reading unit and the second reading unit as a reference reading unit serving as a reference when performing correction to make reading characteristics of the first reading unit and the second reading unit relatively coincide with each other, wherein deciding one of the first reading unit and the second reading unit as the reference reading unit includes deciding the reference reading unit for each color represented by the read color information.

6. A non-transitory computer-readable medium having stored thereon a program which causes a computer to perform a method of controlling an image reading apparatus capable of reading both sides of a double-sided document using a first reading unit and a second reading unit different from the first reading unit, the method comprising:

acquiring pieces of reading frequency information representing the number of reading counts of the first reading unit and the second reading unit, respectively;

acquiring read color information representing appearance frequency of each gamut of a color on a document that is read by one of the first reading unit and the second reading unit; and deciding, based on the reading frequency information and the read color information, one of the first reading unit and the second reading unit as a reference reading unit serving as a reference when performing correction to make reading characteristics of the first reading unit and the second reading unit relatively coincide with each other, wherein deciding one of the first reading unit and the second reading unit as the reference reading unit includes deciding the reference reading unit for each color represented by the read color information.

* * * * *